Oct. 8, 1935. E. VON TOLL 2,016,467
MEANS FOR ILLUMINATING STAGES AND OTHER OBJECTS
Filed Feb. 25, 1932 2 Sheets-Sheet 1

Inventor
ERIC VON TOLL
By
his Attorneys

Oct. 8, 1935.  E. VON TOLL  2,016,467

MEANS FOR ILLUMINATING STAGES AND OTHER OBJECTS

Filed Feb. 25, 1932  2 Sheets-Sheet 2

Inventor
ERIC VON TOLL
By
his Attorneys

Patented Oct. 8, 1935

2,016,467

UNITED STATES PATENT OFFICE 2,016,467

MEANS FOR ILLUMINATING STAGES AND OTHER OBJECTS

Eric von Toll, Columbus, Ohio

Application February 25, 1932, Serial No. 595,092

3 Claims. (Cl. 240—3)

This invention relates to the diffusion of light and has for its object to provide a means for producing glareless illumination which may be employed over a great region without the production of shadows.

It is well known that in theatrical stage lighting, for instance, such a large volume of light is necessary to satisfy an audience that great discomfort and sometimes injury of the eyes is inflicted upon the performers. This is caused by the fact that if an actor or performer faces one or more of a series of lights he is forced to suffer the glare from each of these lights even though he may be satisfactorily illuminated from the audience stand point.

It is therefore an object of the invention to provide an apparatus whereby the light rays from one or a plurality of sources of light may be diffused regardless of the intensity and volume, toward the end that large areas, such as stages, public halls and the like may be illuminated uniformly and without glare.

Another object of the invention is to provide a means for diffusing light and at the same time for directing each diffused ray thereof in such a manner that full advantage may be had from the power supplied to the light source so that the herein revealed apparatus may be employed to advantage over specific areas, as for instance, on theatrical stages, and which, by its great efficiency in the employment of the light rays, may find wide usage in large halls, as for instance, in gymnasiums to also effect a considerable saving of power.

In theaters, for instance, a multiplicity of colors are sometimes employed at a given moment and the performers on the stage ordinarily receive differential illumination, producing an inharmonious effect because of the difficulty or impossibility of properly blending the rays emanating from the several light sources. Thus, if a performer stands considerably closer to one color than to another he will reflect the rays from the nearer color almost to the exclusion of the other.

It is therefore a specific object of the invention to provide means operable in accord with the light dispensing principles related herein for the blending of a plurality of colored rays of lights in order to make possible the production of uniform and more beautiful color effects.

Other objects and advantages will become hereinafter apparent as reference is had to the accompanying drawings wherein my invention is illustrated and in which—

Figure 1:
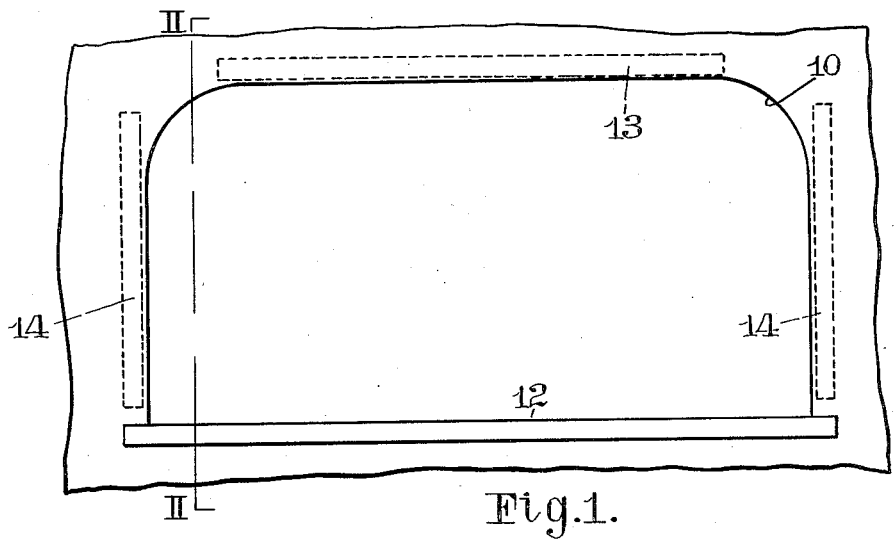
Figure 1 is a representation of the proscenium arch of a theater behind which the apparatus required by my invention is indicated in dotted section.
Figure 2:
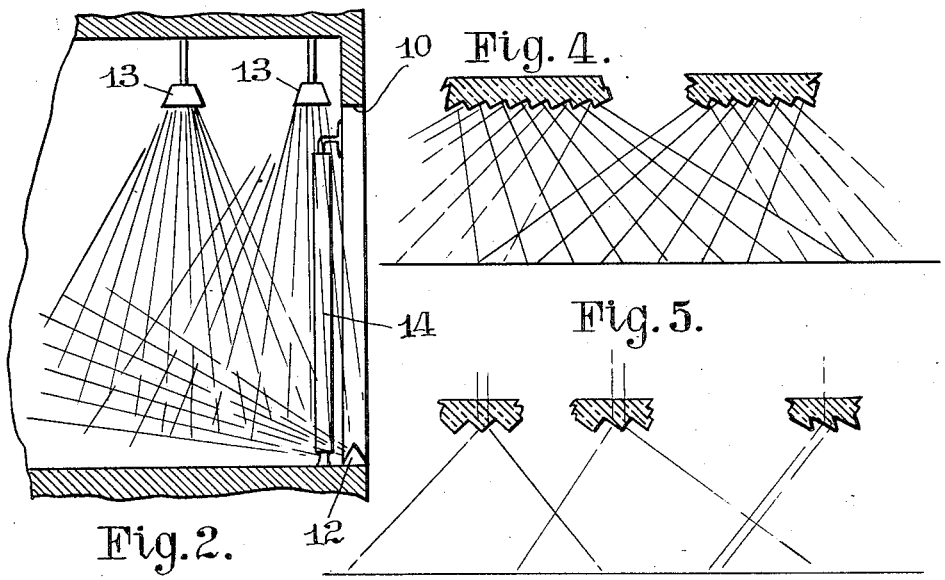
Fig. 2 is a vertical transverse view of the stage, taken along the line II—II, Fig. 2, and partially broken away to conserve space.

More particularly in the views 10 designates the proscenium arch of a theater having a stage therebehind illuminated by the footlights 12, the border lights 13, and by the pivoted lights 14 supported on the proscenium arch 10. Each of these lights is composed of a row, or series of electric lamps 11 housed in a box or reflector hood 15 which is equipped with my improved lens 16.

Figure 4:
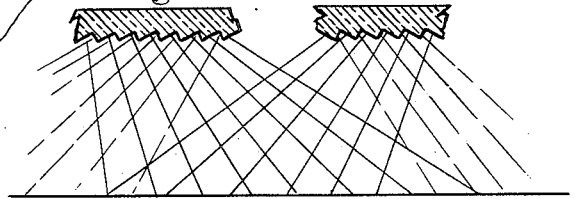
Figs. 4 and 5 are detail views of my improved refractive surface illustrating the dispersion of light passing therethrough.
Figure 5:
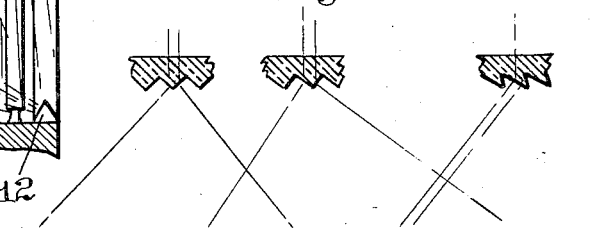
Figure 3:
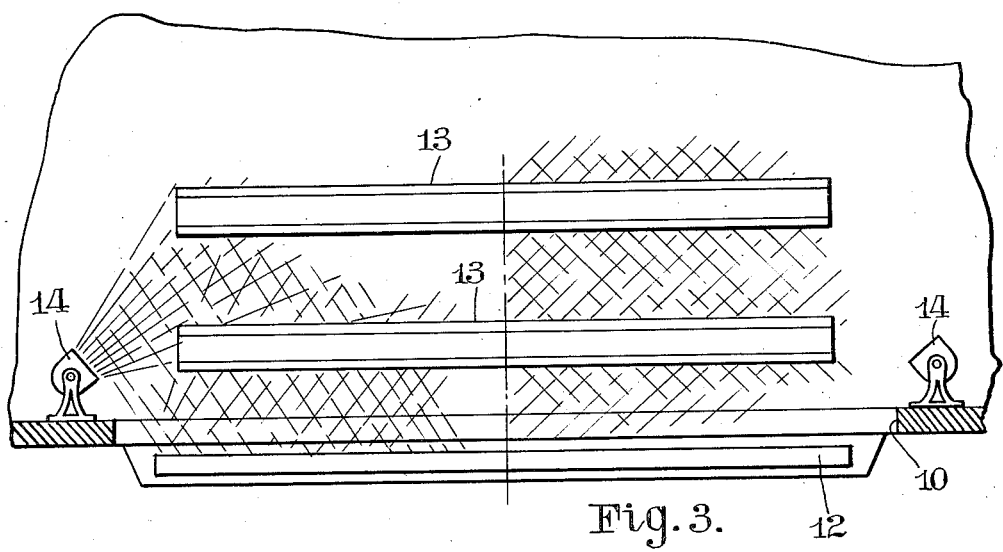
Fig. 3 is a plan view of the stage taken above the upper lights.
Figure 6:
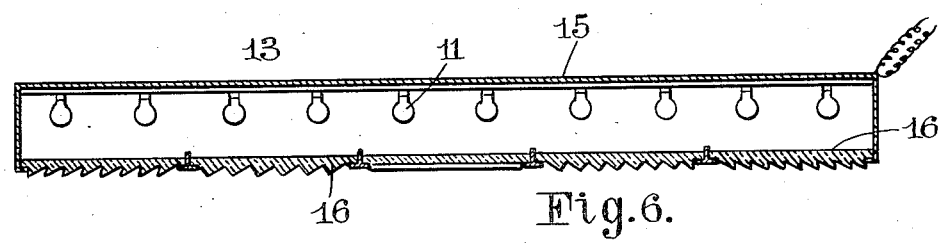
Fig. 6 is a longitudinal section through one of my improved lighting fixtures.
Figure 7:
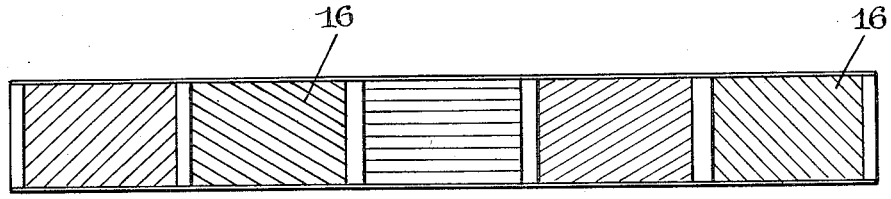
Fig. 7 is a plan view of the total refractive surfaces employed in the fixture of Fig. 6.

The lens 16 is composite of a plurality of lenses, each constituting a series of refractive prisms, as may be seen in Figs. 3, 6 and 7. The prisms in each constituent lens are mutually parallel and, for cheapness of construction all may be of the same angularity. The size and also the angularity of the prisms can be constructed to advantage by slightly varying the angle of each succeeding prism if desired. It will be seen from either element of Fig. 4 that the light rays traversing the lens will be changed in their course to cross the paths of other rays thereby giving the phenomenon of diffusion. A single diffusion resulting from passage through a single lens results in bands of light with resultant dark ridges which are in reality shadows so that a further interspersion of rays becomes of advantage. This is accomplished by the composite lens 16 by means of which each series of prisms directs the rays passing therethrough to a crossing of the paths of the rays from the other prisms. This is clearly illustrated in Figs. 4 and 5 wherein the rays from adjacent series cross each other as also do the rays from the outer series unless intercepted by the rear curtain (or floor) 17. This, then, provides a means for determining the angle of incidence of the rays with the rear curtain and the angularity of the prisms is selected according to the particular environment.

In directing the various light rays across the paths of other rays to eliminate glare and shadow there is employed the refractive surface to direct the beams over a selected area in order to obtain the maximum efficiency from the lamps. It may therefore be said that I provide a controlled diffusion wherein each light ray is directed in a given path in order to illuminate only a selected area.

I have found that my improved lens when used with vari-colored sources of light will effect a blending of the various colors to produce a uniformity unattainable by any other means of which I am aware.

My invention is susceptible of a wide variety of arrangements to accommodate various settings to which it is adaptable and the arrangement and forms can be changed without departing from the gist of the invention as claimed.

What I claim is:

1. Illuminating means for a stage having a proscenium arch, said illuminating means including, in combination, a plurality of rows of lamps for illuminating the stage including foot lights, border lights and vertical lights arranged along the inside of the proscenium arch, each of said rows of lamps having cooperating therewith a series of prismatic light diffusing lenses, said series including a variety of patterns, each of said patterns having a plurality of rectilinear parallel light diffusing prisms of diverse cross-section and each of said patterns different in direction from those of the adjacent pattern or patterns whereby a diverse crisscrossing of the rays from the series of patterns is obtained.

2. Illuminating means for a stage having a proscenium arch, said illuminating means including, in combination, a plurality of rows of lamps including foot lights, vertical lights and overhead lights arranged inside the arch, each of said rows of lamps having a prismatic lens composed of a plurality of patterns, each of said patterns having rectilinear, parallel and similar light diffusing prisms extending in varying direction with respect to adjacent patterns or pattern whereby a varying crisscrossing of the rays from each lens is obtained, each of said composite lenses arranged to provide a varying crisscrossing with the rays of the other composite lenses whereby complete diffusion and uniform illumination of the entire stage is provided.

3. Illuminating means for a stage having a proscenium arch, said means including in combination a plurality of rows of lamps behind said arch, a prismatic lens for each of said rows of lamps, each of said lenses composed of a plurality of patterns, each of said patterns including a plurality of similar parallel prisms extending in a direction at angles to its adjacent pattern or patterns, the prisms of each pattern also varying in cross section from those of its adjacent pattern or patterns, whereby varying crisscrossing of the rays of each lamp with those of the others is effected, said lamps giving rays of different colors, said patterns blending the rays of each lamp with those of the other lamps and uniformly illuminating the stage.

ERIC von TOLL.